United States Patent
Nam et al.

(10) Patent No.: US 8,953,563 B2
(45) Date of Patent: Feb. 10, 2015

(54) METHOD AND SYSTEM FOR MULTI-LAYER BEAMFORMING

(75) Inventors: Young-Han Nam, Richardson, TX (US); Jianzhong Zhang, Irving, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1287 days.

(21) Appl. No.: 12/749,340

(22) Filed: Mar. 29, 2010

(65) Prior Publication Data

US 2010/0272040 A1 Oct. 28, 2010

Related U.S. Application Data

(60) Provisional application No. 61/214,507, filed on Apr. 24, 2009.

(51) Int. Cl.
| | |
|---|---|
| *H04B 7/216* | (2006.01) |
| *H04J 3/06* | (2006.01) |
| *H04B 1/38* | (2006.01) |
| *H04B 1/00* | (2006.01) |
| *H04J 13/10* | (2011.01) |
| *H04J 13/00* | (2011.01) |
| *H04J 13/12* | (2011.01) |
| *H04J 13/16* | (2011.01) |

(52) U.S. Cl.
CPC ............ *H04J 13/10* (2013.01); *H04J 13/0077* (2013.01); *H04J 13/12* (2013.01); *H04J 13/16* (2013.01); *H04J 13/0048* (2013.01)
USPC ............ 370/335; 370/350; 375/219; 375/148

(58) Field of Classification Search
USPC .................................. 370/335, 350; 375/148
See application file for complete search history.

(56) References Cited

U.S. PATENT DOCUMENTS

| | | | |
|---|---|---|---|
| 2006/0159160 A1* | 7/2006 | Kim et al. ..................... | 375/148 |
| 2007/0087749 A1 | 4/2007 | Ionescu et al. | |
| 2007/0160118 A1 | 7/2007 | Charbit | |
| 2008/0019431 A1* | 1/2008 | Kwak et al. .................... | 375/219 |
| 2009/0135803 A1* | 5/2009 | Luo et al. ...................... | 370/350 |

* cited by examiner

*Primary Examiner* — Kiet Tang

(57) ABSTRACT

A base station includes a reference signal sequence generator configured to generate a reference signal sequence for each of n antenna ports using one initialization seed, n being a positive integer. The base station also includes n spreaders. Each spreader corresponds to a respective one of the n antenna ports and is configured to receive a respective reference signal sequence for the respective antenna port from the reference signal sequence generator and spread the respective reference signal sequence using a respective Walsh code. The base station further includes n resource element mappers. Each mapper corresponds to a respective one of the n antenna ports and is configured to receive a respective spread reference signal sequence from a respective spreader and map the respective spread reference signal sequence to a set of reference signal resource elements corresponding to a respective antenna port.

8 Claims, 14 Drawing Sheets

METHOD AND SYSTEM FOR MULTI-LAYER BEAMFORMING

CROSS-REFERENCE TO RELATED APPLICATION(S) AND CLAIM OF PRIORITY

The present application is related to U.S. Provisional Patent Application No. 61/214,507, filed Apr. 24, 2009, entitled "MULTI-LAYER BEAMFORMING METHODS FOR OFDM SYSTEMS". Provisional Patent Application No. 61/214,507 is assigned to the assignee of the present application and is hereby incorporated by reference into the present application as if fully set forth herein. The present application hereby claims priority under 35 U.S.C. §119(e) to U.S. Provisional Patent Application No. 61/214,507.

TECHNICAL FIELD OF THE INVENTION

The present application relates generally to wireless communications and, more specifically, to a method and system for reference signal (RS) pattern design.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station includes a reference signal sequence generator configured to generate a reference signal sequence for each of n antenna ports using one initialization seed, n being a positive integer. The base station also includes n spreaders. Each spreader corresponds to a respective one of the n antenna ports and is configured to receive a respective reference signal sequence for the respective antenna port from the reference signal sequence generator and spread the respective reference signal sequence using a respective Walsh code. The base station further includes n resource element mappers. Each mapper corresponds to a respective one of the n antenna ports and is configured to receive a respective spread reference signal sequence from a respective spreader and map the respective spread reference signal sequence to a set of reference signal resource elements corresponding to a respective antenna port.

A subscriber station includes a receiver configured to receive a spread reference signal sequence from a base station. The spread reference signal sequence is mapped to a set of n reference signal resource elements corresponding to n respective antenna ports with n being a positive integer. The spread reference signal sequence is mapped by n resource element mappers at the base station. Each of the n resource element mappers corresponds to a respective one of the n antenna ports and receives a respective spread reference signal sequence from a respective spreader of n spreaders at the base station. The spread reference signal sequence is spread by n spreaders at the base station. Each of the n spreaders corresponds to a respective one of the n antenna ports and receives a reference signal sequence for the respective antenna port from a reference signal sequence generator at the base station and generates the spread reference signal sequence by spreading the reference signal sequence using a respective Walsh code.

A base station includes a controller configured to assign an energy per resource element (EPRE) value in each channel state information (CSI) reference signal resource element. The base station also includes a transmitter configured to transmit information based at least partly upon the EPRE value to one or more subscriber stations using a higher layer signaling.

A method of operating a base station includes assigning an energy per resource element (EPRE) value in each channel state information (CSI) reference signal resource element. The method also includes transmitting information based at least partly upon the EPRE value to one or more subscriber stations using a higher layer signaling.

A subscriber station includes a receiver configured to receive information based at least partly upon an energy per resource element (EPRE) value in each channel state information (CSI) reference signal resource element from a higher layer signaling.

A method of operating a subscriber station includes receiving information based at least partly upon an energy per resource element (EPRE) value in each channel state information (CSI) reference signal resource element from a higher layer signaling.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
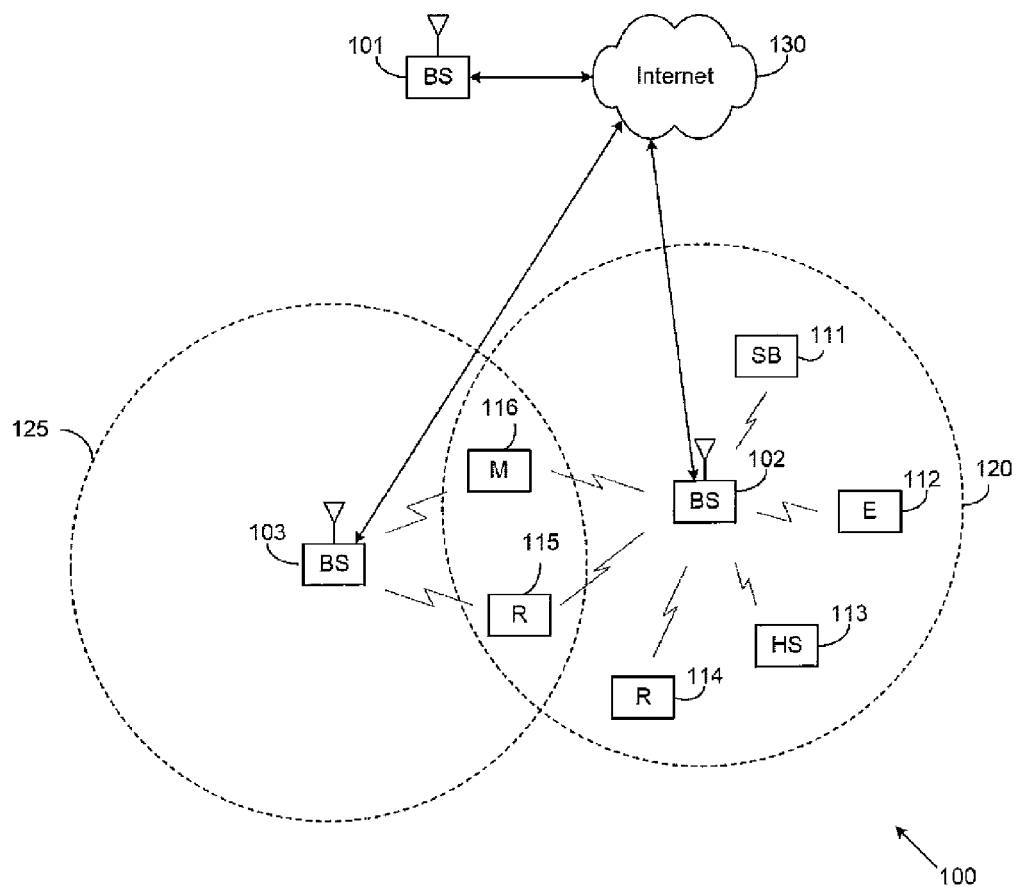
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
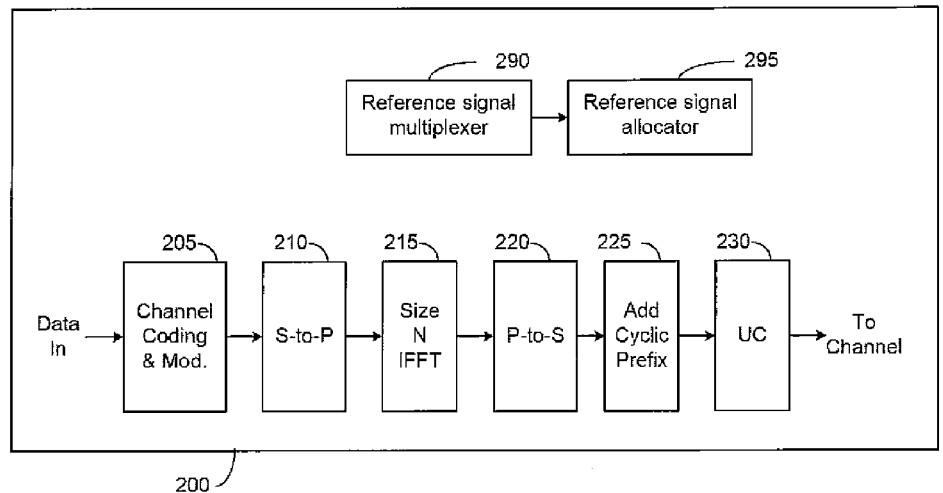
FIG. 2 is a high-level diagram of an OFDMA transmitter according to one embodiment of the disclosure.
Figure 3:
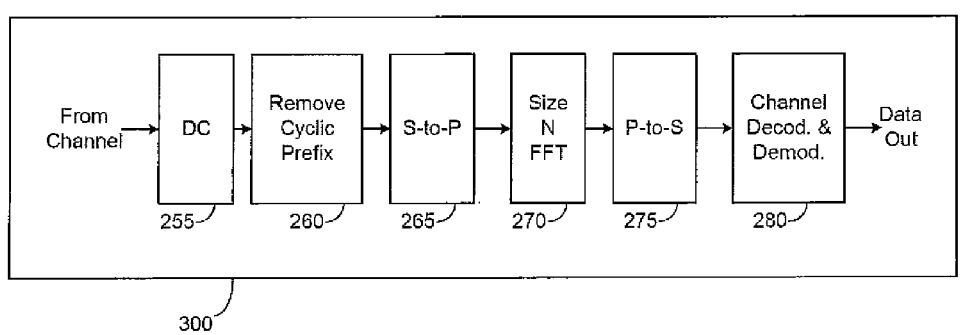
FIG. 3 is a high-level diagram of an OFDMA receiver according to one embodiment of the disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT)

functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a method and system for reference signal (RS) pattern design.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL} N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where k=0, . . . , $N_{RB}^{DL} N_{sc}^{RB}-1$ and l=0, . . . , $N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

In an embodiment of the disclosure, a CQI reference signal (CQI RS) mapping pattern is defined as a set of resource elements (REs) in one resource block (RB) spanning two slots (or one subframe), where the pattern repeats every RB in a subset or in the set of RBs in the system bandwidth.

In particular embodiments, CQI RS REs reside in only one slot or in both slots in an RB in one subframe.

As described in 3GPP 36.211, the contents of which hereby are incorporated by reference, UE-specific reference signals are supported for single-antenna-port transmission in the PDSCH and are transmitted on antenna port 5. The UE is informed by higher layers on whether the UE-specific reference signal is present and if the UE-specific reference signal is a valid reference for PDSCH demodulation. UE-specific reference signals are transmitted only on the resource blocks upon which the corresponding PDSCH is mapped. The UE-specific reference signal is not transmitted in resource elements in which one of the physical channels or physical signals other than UE-specific reference signal are transmitted.

The UE-specific reference-signal sequence r(m) is defined by Equation 1 below:

$$r(m) = \frac{1}{\sqrt{2}}(1 - 2 \cdot c(2m)) + j\frac{1}{\sqrt{2}}(1 - 2 \cdot c(2m+1)),$$ [Eqn. 1]

$$m = 0, 1, \ldots, 12N_{RB}^{PDSCH} - 1,$$

where $N_{RB}^{PDSCH}$ denotes the bandwidth in resource blocks of the corresponding PDSCH transmission. The pseudo-random sequence is denoted by c(i), and the pseudo-random sequence generator is initialised with $c_{init} = (\lfloor n_s/2 \rfloor + 1) \cdot (2N_{ID}^{cell} + 1) \cdot 2^{16} + n_{RNTI}$ at the start of each subframe.

In a physical resource block with a frequency-domain index $n_{PRB}$ assigned to the corresponding PDSCH transmission, the reference signal sequence r(m) is mapped to complex-valued) modulation symbols $a_{k,l}^{(p)}$ with p=5 in a subframe according to the following equations:

Normal Cyclic Prefix:

$$a_{k,l}^{(p)} = r(3 \cdot l' \cdot N_{RB}^{PDSCH} + m'),$$ [Eqn. 2]

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1.$$

Extended Cyclic Prefix:

$$a_{k,l}^{(p)} = r(4 \cdot l' \cdot N_{RB}^{PDSCH} + m'),$$ [Eqn. 3]

$$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1,$$

where m' is the counter of UE-specific reference signal resource elements within a respective OFDM symbol of the PDSCH transmission.

The cell-specific frequency shift is given by:

$$v_{shift} = N_{ID}^{cell} \bmod 3.$$ [Eqn. 4]

The mapping is in increasing order of the frequency-domain index $n_{PRB}$ of the physical resource blocks assigned to the corresponding PDSCH transmission. The quantity $N_{RB}^{PDSCH}$ denotes the bandwidth in resource blocks of the corresponding PDSCH transmission.

The notation $R_p$ is used to denote a resource element used for reference signal transmission on antenna port p.

In a telecommunication scenario called multi-layer beamforming, two or more encoded data streams (or two or more layers) are multiplexed in the same set of time-frequency resources together with two sets of dedicated RSs. Here, the dedicated RSs are precoded with the same precoding vector as the data streams.

For dual-layer beamforming, two sets of dedicated RSs (DRS or DM-RS) are defined for demodulation, where two sets of RSs can be multiplexed in the RBs of a subframe using time-division multiplexing (TDM), frequency-division multiplexing (FDM), code-division multiplexing (CDM), or any combination of these methods.

In particular, when a signal pattern is used for multiple consecutive RBs, the locations of the RS REs for the layers are in particular locations when the RB index is even, while the locations of the RS REs for the layers will be swapped when the RB index is odd.

U.S. non-provisional application Ser. No. 12/650,898 filed on Dec. 31, 2009, and 3GPP RAN1 contribution R1-090185, "Dual ports DRS design for BF," CATT, 3GPP TSG RAN WG1 meeting #55bis, January 2009, describe additional RS patterns for dual-layer beamforming. Both references are hereby incorporated by reference into the present application as if fully set forth herein.

In particular embodiments, CDM/FDM-based pilot patterns can support up to 4 layer transmissions.

3GPP RAN1 contribution R1-090875, "Further Considerations and Link Simulations on Reference Signals in LTE-A," Qualcomm Europe, 3GPP TSG RAN WG1 meeting #56, February 2009, further describes CDM/FDM-based pilot patterns that can support up to 4 layer transmissions and is hereby incorporated by reference into the present application as if fully set forth herein.

In 3GPP TS 36211 V8.6.0, "3$^{rd}$ Generation Partnership Project; Technical Specification Group Radio Access Network; Evolved Universal Terrestrial Radio Access (E-UTRA); Physical Channels and Modulation (Release 8)", March 2009, which is hereby incorporated by reference into the present application as if fully set forth herein, pseudo-random sequences are defined by a length-31 Gold sequence. The output sequence c(n) of length $M_{PN}$, where n=0, 1, . . . , $M_{PN}$−1, is defined by Equation 5 below:

$$c(n) = (x_1(n+N_C) + x_2(n+N_C)) \bmod 2$$

$$x_1(n+31) = (x_1(n+3) + x_1(n)) \bmod 2$$ [Eqn. 5]

$$x_2(n+31) = (x_2(n+3) + x_2(n+2) + x_2(n+1) + x_2(n)) \bmod 2$$

where $N_C$=1600 and the first m-sequence is initialized with $x_1(0)$=1, $x_1(n)$=0, n=1, 2, . . . , 30. The initialization of the second m-sequence is denoted by $c_{init} = \sum_{i=0}^{30} x_2(i) \cdot 2^i$ with the value depending on the application of the sequence.

In one embodiment, an initialization seed is inputted into a pseudo-random sequence generator. In a particular embodiment, the initialization seed is a 32-bit initialization seed. The pseudo-random sequence generator then uses the initialization seed to generate a pseudo-random sequence.

According to Section 5.2 in 3GPP 36.213, which is hereby incorporated by reference into the present application as if fully set forth herein, the eNodeB determines the downlink transmit energy per resource element (EPRE).

A UE may assume that the downlink cell-specific RS EPRE is constant across the downlink system bandwidth and constant across all subframes until a different cell-specific RS power information is received. The downlink reference-signal EPRE can be derived from the downlink reference-signal transmit power given by the parameter Reference-signal-power provided by higher layers. The downlink reference-signal transmit power is defined as the linear average over the power contributions (in [W]) of all resource elements that carry cell-specific reference signals within the operating system bandwidth.

The ratio of PDSCH EPRE to cell-specific RS EPRE among PDSCH REs (not applicable to PDSCH REs with zero EPRE) for each OFDM symbol is denoted by either $\rho_A$ or $\rho_B$. In addition, $\rho_A$ and $\rho_B$ are UE-specific.

The UE may assume that for 16 QAM, 64 QAM, TRI>1 spatial multiplexing or for PDSCH transmissions associated with the multi-user MIMO transmission mode, $\rho_A$ is equal to $\delta_{power-offset}+P_A+10 \log_{10}(2)$ [dB] when the UE receives a PDSCH data transmission using precoding for transmit diversity with 4 cell-specific antenna ports according to Section 6.3.4.3 of 3GPP RAN1 contribution R1-090875, "Further Considerations and Link Simulations on Reference Signals in LTE-A," Qualcomm Europe, 3GPP TSG RAN WG1 meeting #56, February 2009, which is hereby incorporated by reference into the present application as if fully set forth herein, and $\rho_A$ is equal to $\delta_{power-offset}+P_A$ [dB] otherwise, Where $\delta_{power-offset}$ is 0 dB for all transmission modes except multi-user MIMO and where $P_A$ is a UE-specific parameter provided by higher layers.

If UE-specific RSs are present in a physical resource block (PRB), the ratio of PDSCH EPRE to UE-specific RS EPRE for each OFDM symbol is the same. In addition, the UE may assume that for 16QAM or 64QAM, this ratio is 0 dB.

The cell-specific ratio $\rho_B/\rho_A$ is derived from the cell-specific parameter $P_B$ signalled by higher layers and the number of configured eNodeB cell specific antenna ports.

For a physical multicast channel (PMCH) with 16QAM or 64QAM, the UE may assume that the ratio of PMCH EPRE to MBSFN RS EPRE is equal to 0 dB.

In an advanced system extended from a legacy Rel-8 LTE system, an RB may contain a number of different types of REs, including data REs, legacy cell-specific RS (CRS) REs, channel state information (CSI) RS REs for the advanced system. U.S. non-provisional application Ser. No. 12/587,164 filed on Oct. 2, 2009, describes such an RB and is hereby incorporated by reference into the present application as if fully set forth herein. In CSI RS REs, reference signal symbols are transmitted from an eNodeB to UEs, so that the advanced UEs can measure the channel to find out the MIMO channel coefficients, channel quality information (CQI), precoding matrix information (PMI), and rank information (RI) associated with the MIMO channel between the eNodeB and the UE.

Figure 4:
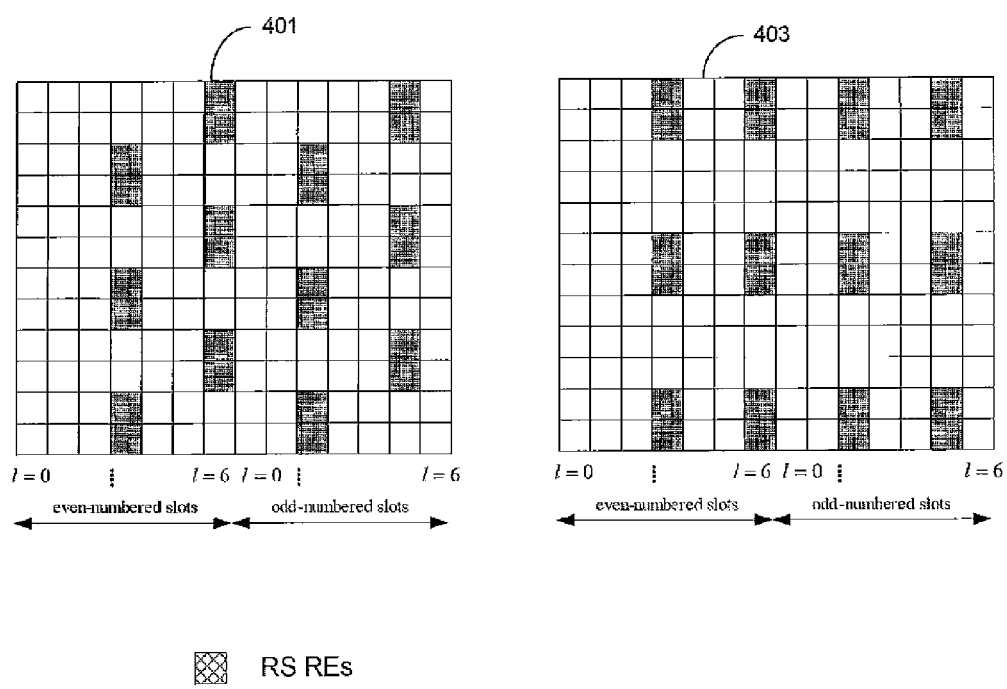
FIG. 4 illustrates pilot patterns for transmitting reference signals for a number of UE-specific antenna ports according to embodiments of the present disclosure.

FIG. 4 illustrates pilot patterns for transmitting reference signals for a number of UE-specific antenna ports according to embodiments of the present disclosure.

As shown in pilot pattern 401, OFDM symbol 3 in the even-numbered slots and OFDM symbol 2 in the odd-numbered slots have reference signals in the one set of subcarriers while OFDM symbol 6 in the even-numbered slots and OFDM symbol 5 in the odd-numbered slots have reference signals in a different set of subcarriers. In distinct contrast, all of the OFDM symbols in pilot pattern 403 have reference signals in the same set of subcarriers.

Figure 5:
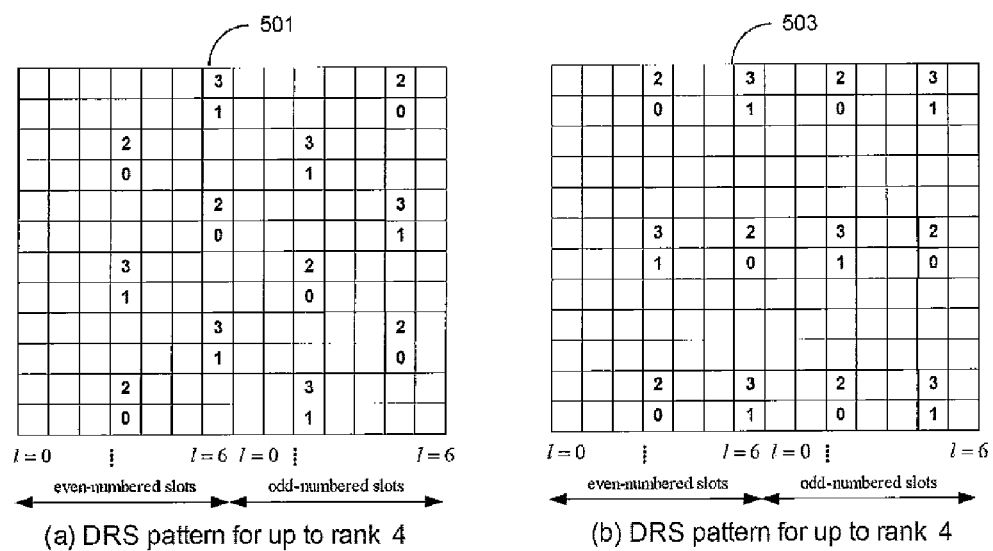
FIG. 5 illustrates pilot patterns for transmitting reference signals for up to four UE-specific antenna ports (or four data transmission layers) according to embodiments of the present disclosure.

FIG. 5 illustrates pilot patterns for transmitting reference signals for up to four UE-specific antenna ports (or four data transmission layers) according to embodiments of the present disclosure.

Pilot pattern 501 has a pattern similar to pilot pattern 401, and pilot pattern 503 has a pattern similar to pilot pattern 403. In this embodiment, a resource element with a label g carries a pilot symbol in the resource grid of antenna port g or data transmission layer g. When the number of transmission layers $N_P$ is smaller than 4, only the RS REs labeled up to $N_P-1$ carry the reference signal symbols, while the other RS REs may carry data symbols.

Figure 6:
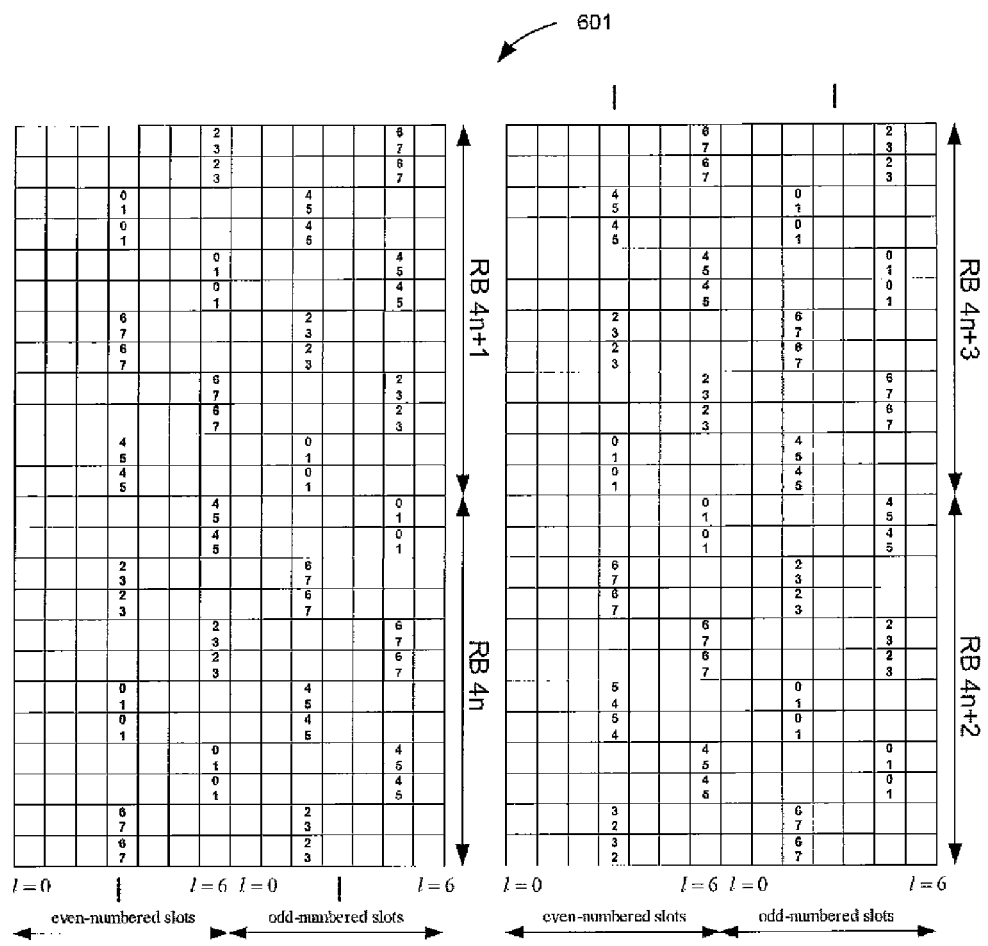
FIG. 6 illustrates a pilot pattern for transmitting reference signals for up to eight UE-specific antenna ports (or eight data transmission layers) according to an embodiment of the present disclosure.

FIG. 6 illustrates a pilot pattern for transmitting reference signals for up to eight UE-specific antenna ports (or eight data transmission layers) according to an embodiment of the present disclosure.

As shown in FIG. 6, pilot pattern 601 has a pattern similar to pilot pattern 401 and is used for transmitting reference signals for up to eight UE-specific antenna ports (or eight transmission layers) when the number of transmission layers is greater than four. In particular embodiments, n is a positive integer, and adjacent squares with labels 2p and 2p+1 carry Walsh-spread pilots where the Walsh code for 2p is [1 1] and the Walsh code for 2p+1 is [1 −1], where p=0, 1, 2, 3, etc. Pilot pattern 601 repeats every four RBs.

Figure 7:
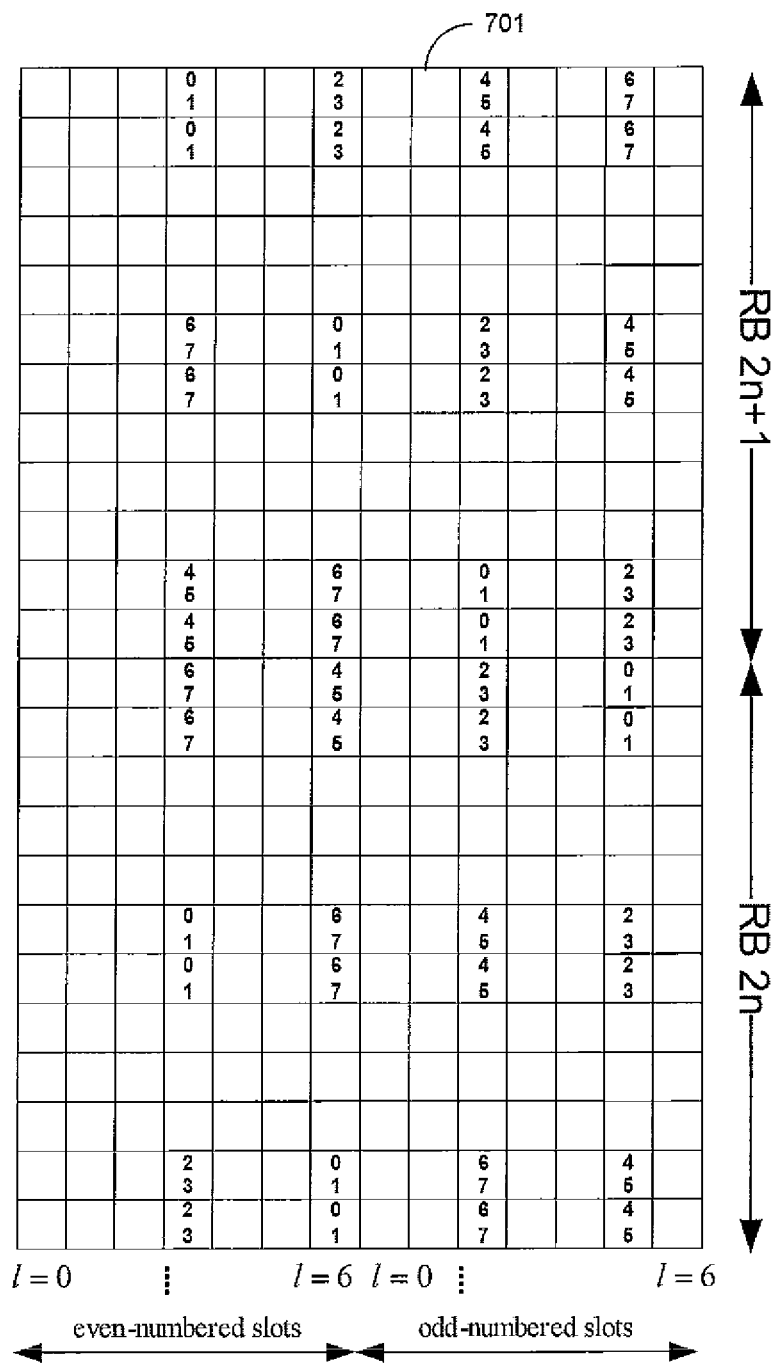
FIG. 7 illustrates a pilot pattern for transmitting reference signals for up to eight UE-specific antenna ports (or eight data transmission layers) according to another embodiment of the present disclosure.

FIG. 7 illustrates a pilot pattern for transmitting reference signals for up to eight UE-specific antenna ports (or eight data transmission layers) according to another embodiment of the present disclosure.

As shown in FIG. 7, pilot pattern 701 has a pattern similar to pilot pattern 403 and is used for transmitting reference signals for up to eight UE-specific antenna ports (or eight transmission layers) when the number of transmission layers is greater than four. In particular embodiments, n is a positive integer, and adjacent squares with labels 2p and 2p+1 carry Walsh-spread pilots where the Walsh code for 2p is [1 1] and the Walsh code for 2p+1 is [1 −1], where p=0, 1, 2, 3, etc. Pilot pattern 701 repeats every two RBs.

Figure 8:
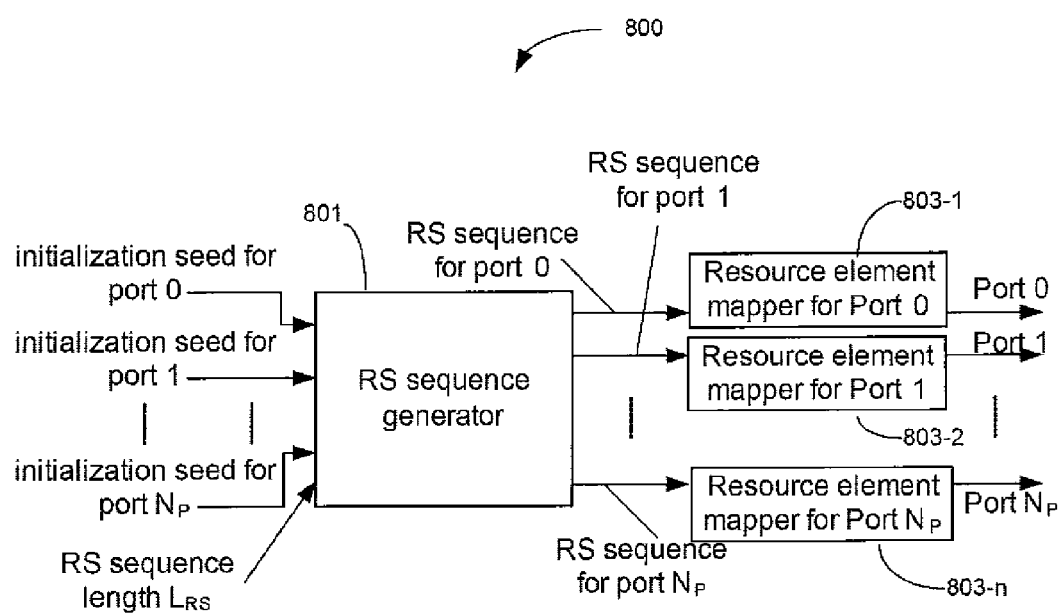
FIG. 8 illustrates a system for generating and mapping reference signal sequences according to an embodiment of the present disclosure.

FIG. 8 illustrates a system for generating and mapping reference signal sequences according to an embodiment of the present disclosure.

As shown in FIG. 8, system 800 generates a plurality of RS sequences and maps the generated RS sequences onto a number of antenna ports in two steps. The generated RS sequences can be mapped onto either cell-specific antenna ports or UE-specific (or dedicated) antenna ports.

The RS sequence generator 801 receives an initialization seed $C_{init,g}$ for generating a pseudo-random sequence $c_g(i)$. In particular embodiments, the initialization seed $c_{init,g}$ is dependent on the index of the antenna port, g, as shown in Equations 6 and 7 below:

$$c_{init,g}=(g+z+1)(\lfloor n_s/2 \rfloor+1)\cdot(2N_{ID}^{cell}+1)\cdot 2^{16}+n_{RNTI}, \quad \text{[Eqn. 6]}$$

and another example is $$c_{init,g}=(\lfloor n_s/2 \rfloor+g+z+1)\cdot(2N_{ID}^{cell}+1)\cdot 2^{16}+n_{RNTI}, \quad \text{[Eqn. 7]}$$

where g is the antenna port index, and g=0, 1, ..., $N_P-1$ and $N_P$ indicates the number of antenna ports that transmit RS signals. When the antenna ports are UE-specific (or dedicated) antenna ports, $N_P$ indicates the number of layers transmitted in a subframe. For example, g=0, 1, ..., 7 in an 8-layer transmission case, and g=0, 1 in a dual-layer transmission case. Also, z is an integer parameter, e.g, z=0 or z=1.

In a particular embodiment, the pseudo-random sequence $c_g(i)$ is defined as provided in Section 7.2 of 3GPP TS 36211 V8.6.0, "3$^{rd}$ Generation Partnership Project; Technical Specification Group Radio Access Network; Evolved Universal Terrestrial Radio Access (E-UTRA); Physical Channels and Modulation (Release 8)", March 2009, which is hereby incorporated by reference into the present application as if fully set forth herein.

The RS sequence generator 801 then uses the pseudo-random sequence $c_g(i)$ to generate a respective RS sequence for each of the antenna ports and sends each RS sequence to a respective resource element mapper 803-1 to 803-n for each of the antenna ports.

Figure 9:
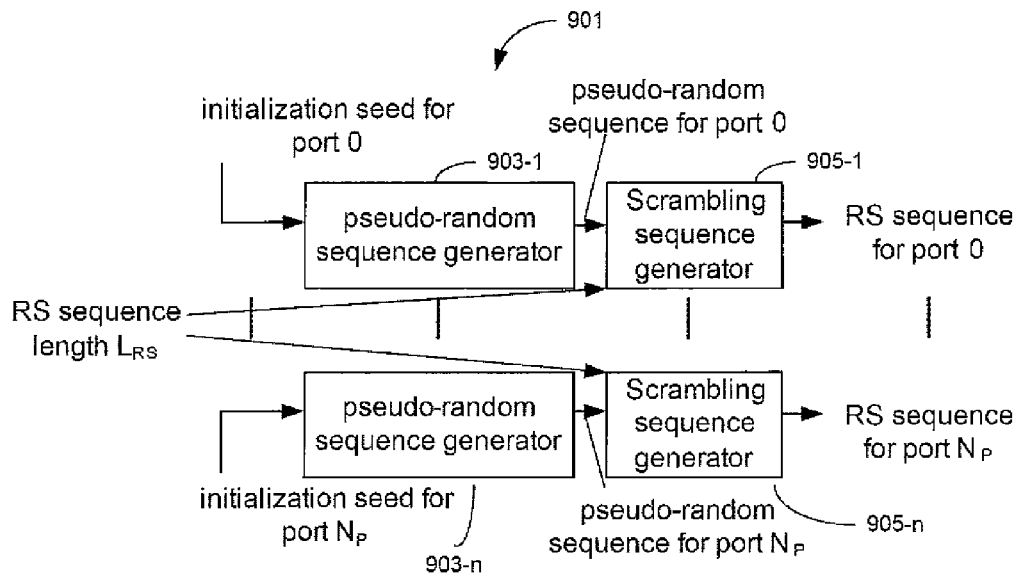
FIG. 9 illustrates a reference signal sequence generator according to an embodiment of the present disclosure.

FIG. 9 illustrates a reference signal sequence generator according to an embodiment of the present disclosure.

As shown in FIG. 9, an RS sequence generator 901 is composed of a plurality of pseudo-random sequence generators 903-1 to 903-n and scrambling sequence generators 905-1 to 905-n.

In a particular embodiment, the RS sequences (or scrambling sequences) are generated in a way such that for each antenna port, the RS sequence is generate from a layer-dependent pseudo-random sequence $c_g(i)$ as shown in Equation 8 below:

$$r_g(m) = \frac{1}{\sqrt{2}}(1 - 2 \cdot c_g(2m)) + j\frac{1}{\sqrt{2}}(1 - 2 \cdot c_g(2m+1)), \quad \text{[Eqn. 8]}$$

$$m = 0, 1, \ldots, L_{RS},$$

$$\text{where } L_{RS} = K\frac{N_{RB}^{PDSCH}}{N_{RB}^{RSG}} - 1$$

is the length of the per-port RS modulation symbol sequence, and K is the number of RS modulation symbols used in one RB for each antenna port. Meanwhile, $N_{RB}^{RSG}$ (with typical value of 1 or 2) indicates the number of RBs that form a complete repetition of the RS RE pattern for all the $N_P$ antenna ports (associated with $N_P$ layers).

Figure 10:
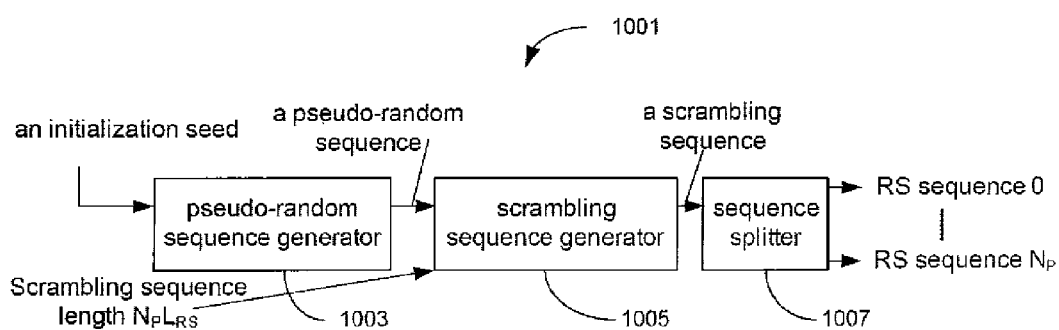
FIG. 10 illustrates a reference signal sequence generator according to another embodiment of the present disclosure.

FIG. 10 illustrates a reference signal sequence generator according to another embodiment of the present disclosure.

As shown in FIG. 10, an RS sequence generator 1001 includes a pseudo-random sequence generator 1003 and a scrambling sequence generator 1005 followed by a sequence splitter 1007.

In one embodiment, the pseudo-random sequence generator 1003 generates a pseudo-random sequence c(i) using an initialization seed as provided in Section 7.2 of 3GPP TS 36211 V8.6.0, "$3^{rd}$ Generation Partnership Project; Technical Specification Group Radio Access Network; Evolved Universal Terrestrial Radio Access (E-UTRA); Physical Channels and Modulation (Release 8)", March 2009, which is hereby incorporated by reference into the present application as if fully set forth herein. In a particular embodiment, one possible initialization seed is $c_{init}=(\lfloor n_s/2 \rfloor+1) \cdot (2N_{ID}^{cell}+1) \cdot 2^{16} + n_{RNTI}$.

The scrambling sequence generator 1005 receives the pseudo-random sequence c(i) from the pseudo-random sequence generator 1003 and generates a scrambling sequence of length $N_P L_{RS}$ from the pseudo-random sequence c(i) as shown in Equation 9 below:

$$r(m) = \frac{1}{\sqrt{2}}(1 - 2 \cdot c(2m)) + j\frac{1}{\sqrt{2}}(1 - 2 \cdot c(2m+1)), \quad \text{[Eqn. 9]}$$

$$m = 0, 1, \ldots, N_P L_{RS} - 1,$$

Moreover, the sequence splitter 1007 receives the scrambling sequence from the scrambling sequence generator 1005 and generates RS sequences for different antenna ports using the scrambling sequence. In particular embodiments, the sequence splitter 1007 splits a scrambling sequence r(m) into sub-sequences, denoted by $\{r_g(m)\}$ g=0, ..., $N_P-1$, m=0, ..., $L_{RS}-1$ where each sub-sequence is intended for a different antenna port and is of length $L_{RS}$.

Figure 11:
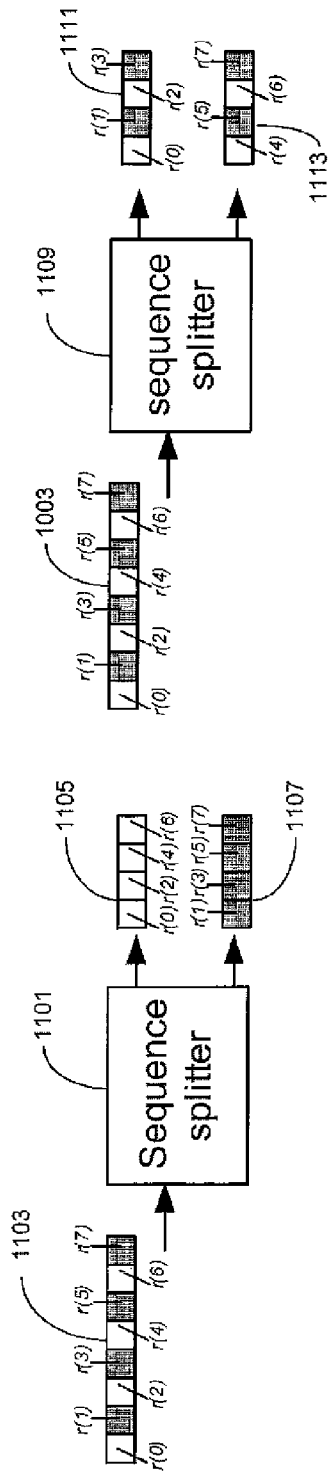
FIG. 11 illustrates the operation of two sequence splitters according to embodiments of the present disclosure.

FIG. 11 illustrates the operation of two sequence splitters according to embodiments of the present disclosure.

As shown in FIG. 11, a sequence splitter 1101 splits a source sequence 1103 into two subsequences, 1105 and 1107. Each subsequence is generated by taking either the even or odd elements in the source sequence 1103. For example, the subsequence 1105 is generated by taking the even elements in the source sequence 1103, and the subsequence 1107 is generated by taking the odd elements in the source sequence. The operation of the sequence splitter 1101 can be generalized to generate $N_P$ subsequences from a source sequence. In this case, each subsequence is generated by taking every $N_P$-th element starting from $r(m_0)$, where $m_0=0, \ldots, N_P-1$.

FIG. 11 also shows a sequence splitter 1109 splitting the source sequence 1103 into two subsequences, 1111 and 1113. Each subsequence is generated by taking either the first or the second half of the elements in the source sequence 1103. For example, the subsequence 1111 is generated by taking the first half of the elements in the source sequence 1103, and the subsequence 1113 is generated by taking the second half of the elements in the source sequence 1103. The operation of the sequence splitter 1109 can be generalized to generate $N_P$ subsequences from a source sequence. In this case, each subsequence is generated by taking $m_0$-th partition, where $m_0=0, \ldots, N_P-1$, when the source sequence is partitioned into $N_P$ groups of the same number (i.e., $L_{RS}$) of consecutive elements.

Figure 12:
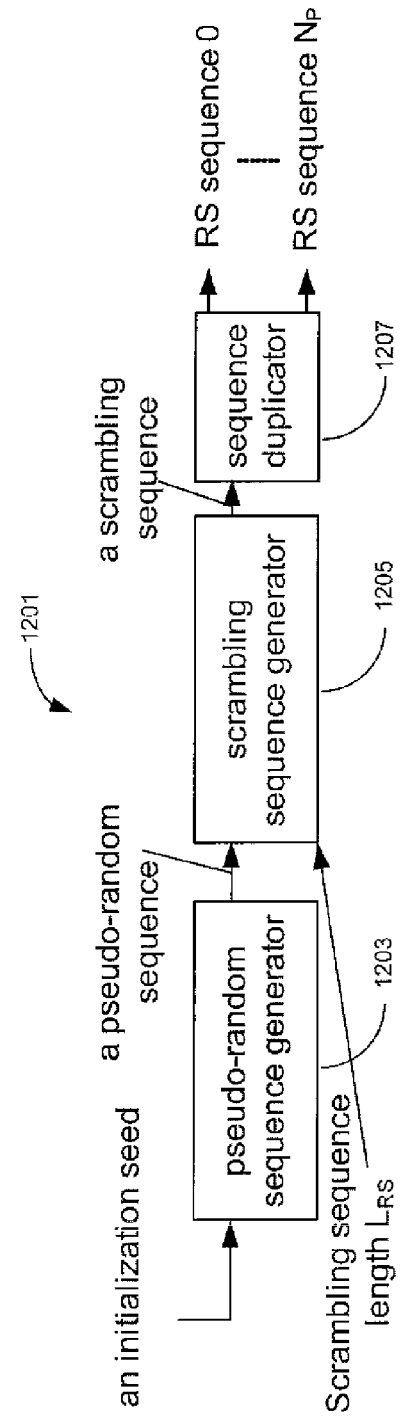
FIG. 12 illustrates a reference signal sequence generator according to a further embodiment of the present disclosure.

FIG. 12 illustrates a reference signal sequence generator according to a further embodiment of the present disclosure.

As shown in FIG. 12, an RS sequence generator 1201 includes a pseudo-random sequence generator 1203 and a scrambling sequence generator 1205 followed by a sequence duplicator 1207.

The pseudo-random sequence generator 1203 generates a pseudo-random sequence c(i) with an initialization seed as provided in Section 7.2 of 3GPP TS 36211 V8.6.0, "$3^{rd}$ Generation Partnership Project; Technical Specification Group Radio Access Network; Evolved Universal Terrestrial Radio Access (E-UTRA); Physical Channels and Modulation (Release 8)", March 2009, which is hereby incorporated by reference into the present application as if fully set forth herein. For example, one possible initialization seed is $c_{init}=(\lfloor n_s/2 \rfloor+1) \cdot (2N_{ID}^{cell}+1) \cdot 2^{16} + n_{RNTI}$.

The scrambling sequence generator 1205 receives the pseudo-random sequence c(i) from the pseudo-random sequence generator 1203 and generates a scrambling sequence of length $L_{RS}$ from the pseudo-random sequence c(i) as shown in Equation 10 below:

$$r(m) = \frac{1}{\sqrt{2}}(1 - 2 \cdot c(2m)) + j\frac{1}{\sqrt{2}}(1 - 2 \cdot c(2m+1)), \quad \text{[Eqn. 10]}$$

$$m = 0, 1, \ldots, L_{RS} - 1.$$

In a particular embodiment, the sequence duplicator 2107 receives the scrambling sequence from the scrambling sequence generator 1205 and generators the same RS sequences for the different antenna ports, which are r(m), m=0, ..., $L_{RS}-1$.

Figure 13:
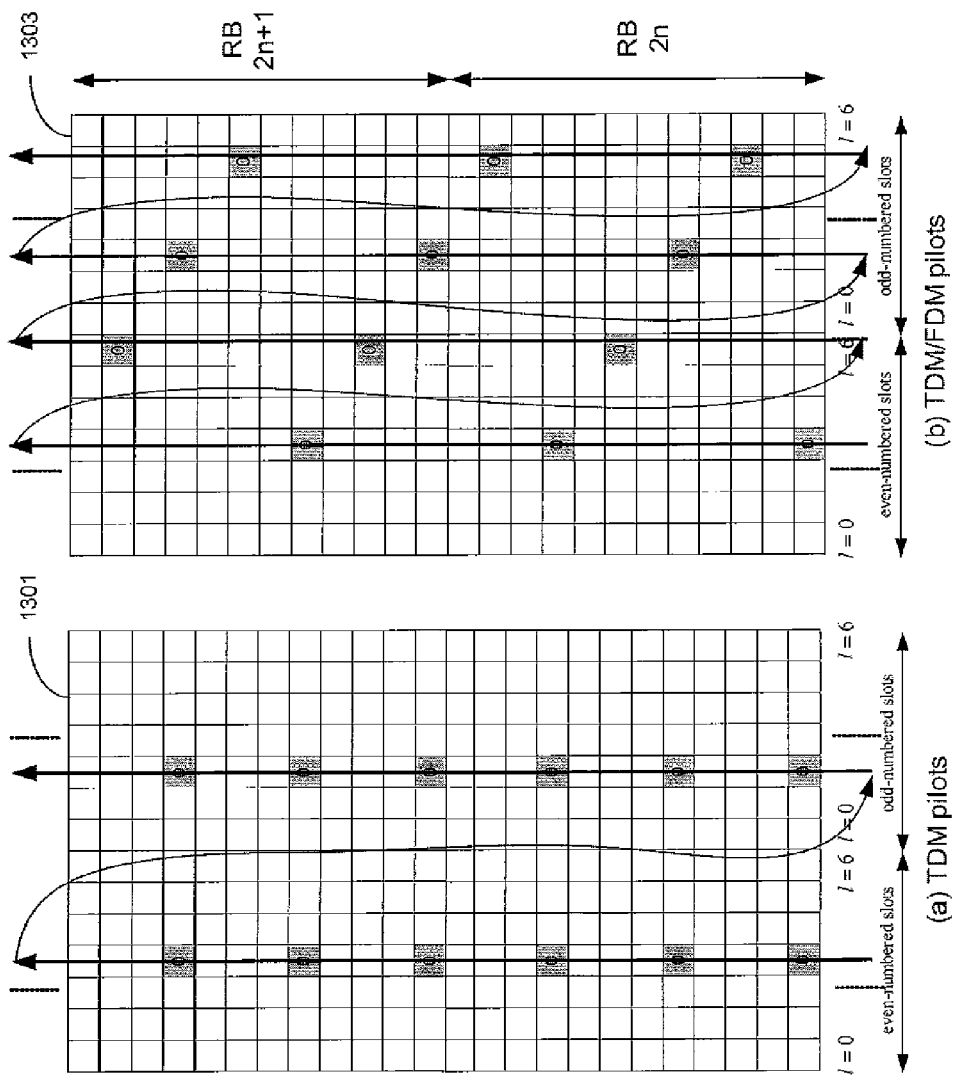
FIG. 13 illustrates a manner of mapping symbols of a reference signal sequence for an antenna port in a specific reference signal pattern according to an embodiment of the present disclosure.

FIG. 13 illustrates a manner of mapping symbols of a reference signal sequence for an antenna port in a specific reference signal pattern according to an embodiment of the present disclosure.

As indicated by the arrows in FIG. 13, a resource element mapper maps the symbols of an RS sequence for an antenna port onto the RS REs for the antenna port in a specific RS pattern in a frequency-first manner. In particular, the resource element mapper for an antenna port maps the first symbol of its RS sequence onto the RS RE with the lowest subcarrier index and the lowest OFDM-symbol index, the second symbol onto the RS RE with the second lowest subcarrier index and the next lowest OFDM-symbol index and so forth. Once reference signal symbols are mapped onto all the RS REs in the lowest OFDM-symbol index, the resource element mapper proceeds to the next OFDM symbol with RS REs for the antenna port and maps the remaining reference signal symbols starting from the RS RE with the lowest subcarrier index and proceeding to the RS RE with the highest subcarrier index.

As shown in pilot patterns 1301 and 1303, the RS symbols for antenna port 0 are mapped onto RS REs for antenna port 0 in a number of consecutive RBs. In this particular embodiment, it is assumed that a UE is allocated a number of consecutive RBs, including RBs 2n and 2n+1, and at least one DRS associated with a transmission layer is transmitted in the allocated RBs for the UE, where n is a positive integer.

Figure 14:
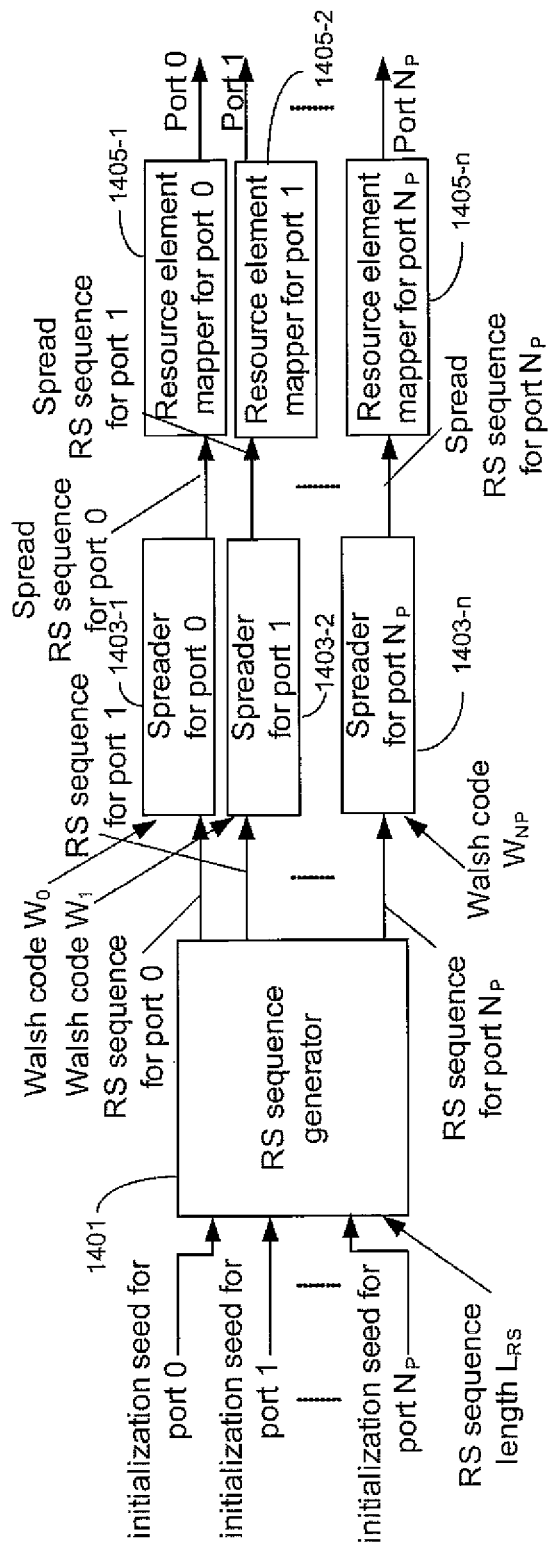
FIG. 14 illustrates a system for generating and mapping reference signal sequences according to another embodiment of the present disclosure.

FIG. 14 illustrates a system for generating and mapping reference signal sequences according to another embodiment of the present disclosure.

FIG. 14 illustrates a system 1400 for generating a plurality of RS sequences and mapping the RS sequences onto a number of antenna ports in three steps, i.e., generating RS sequence, spreading, and resource element mapping. The generated RS sequences can be mapped onto either cell-specific antenna ports or UE-specific (or dedicated) antenna ports.

As shown in FIG. 14, an RS sequence generator 1401 receives an initialization seed $c_{init,g}$ for generating a respective RS sequence for each of the antenna ports and sending each RS sequence to a respective spreader 1403-1 to 1403-*n*. The RS sequence generator 1401 may be any of the RS sequence generators 901, 1001, or 1201.

In this embodiment, the spreaders 1403-1 to 1403-*n* spread the received RS sequence for layer g (or antenna port g) $r_g(m)$ with a Walsh code $W_g$ with spreading factor $N_{SF}$. The spreaders 1403-1 to 1403-*n* then send the spread RS sequence to a respective resource element mapper 1405-1 to 1405-*n* for each of the antenna ports.

When a complex number z is spread using a Walsh code $W_g = [w_g(0), w_g(1), \ldots, w_g(N_{SF}-1)]$, where $N_{SF}$ is a spreading factor, a sequence of $N_{SF}$ complex numbers is obtained, i.e., $zW_g = z[w_g(0), w_g(1), \ldots, w_g(N_{SF}-1)]$.

Figure 15:
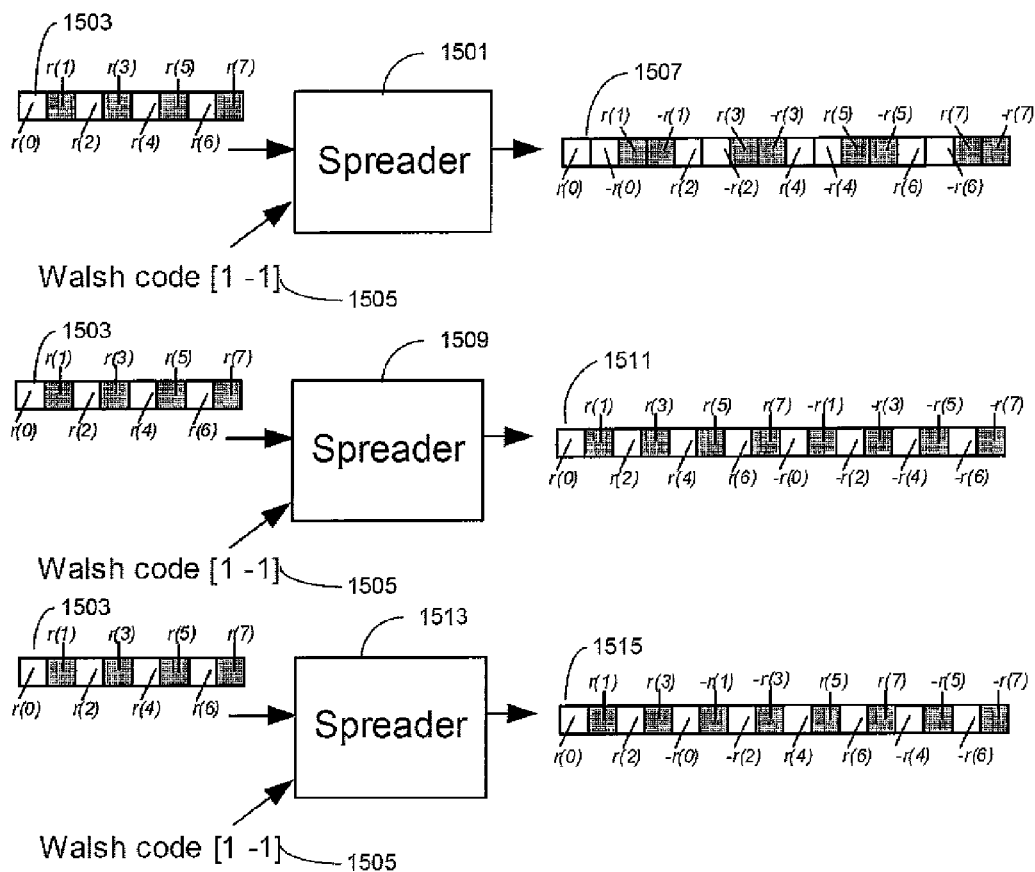
FIG. 15 illustrates the operation of three spreaders according to embodiments of the present disclosure.

FIG. 15 illustrates the operation of three spreaders according to embodiments of the present disclosure.

In this embodiment, spreaders 1501, 1509 and 1513 spread a complex sequence $\{r(m)\}$ using a Walsh code $W_g = [w_g(0), w_g(1), \ldots, w_g(N_{SF}-1)]$.

The spreader 1501 spreads a source sequence 1503 using a Walsh code [1 −1] 1505 into an output sequence 1507 having twice the length of the source sequence 1503. In this embodiment, the spreader 1501 spreads an element (a complex number) in the source sequence 1503 into a sequence of two numbers, and the output sequence 1507 is constructed by concatenating the sequences from each element in a source sequence, one after another. The operation of the spreader 1501 can be generalized to generate an output sequence from a source sequence using an arbitrary Walsh code.

The spreader 1509 spreads the source sequence 1503 using the Walsh code [1 −1] 1505 into an output sequence 1511 having twice the length of the source sequence 1503 by concatenating two sequences. The first sequence is obtained by multiplying the first element of the Walsh code 1505 to the source sequence 1503, and the second sequence is obtained by multiplying the second element of the Walsh code 1505 to the source sequence 1503. The operation of the spreader 1509 can be generalized to generate an output sequence from a source sequence using an arbitrary Walsh code.

The spreader 1513 spreads the source sequence 1503 using the Walsh code [1 −1] 1505 into an output sequence 1515 having twice the length of the source sequence 1503 by concatenating four sequences. The first sequence is obtained by multiplying the first element of the Walsh code 1505 to the first half of the source sequence 1503, the second sequence is obtained by multiplying the second element of the Walsh code 1505 to the first half of the source sequence 1503, the third sequence is obtained by multiplying the first element of the Walsh code 1505 to the second half of the source sequence 1503, and the fourth sequence is obtained by multiplying the second element of the Walsh code 1505 to the second half of the source sequence 1503. The operation of the spreader 1513 can be generalized to generate an output sequence from a source sequence using an arbitrary Walsh code.

In particular embodiments, the spreader 1509 can be used for CDM pilot patterns, and the resource element mapper for antenna port g (or layer g) maps the spread RS sequence symbols for the antenna port onto RS REs associated with the antenna port g.

In some embodiments, the resource element mapping for antenna port g, where g=0, 1, can be done in three ways, depending on which spreader has been used.

Figure 16:
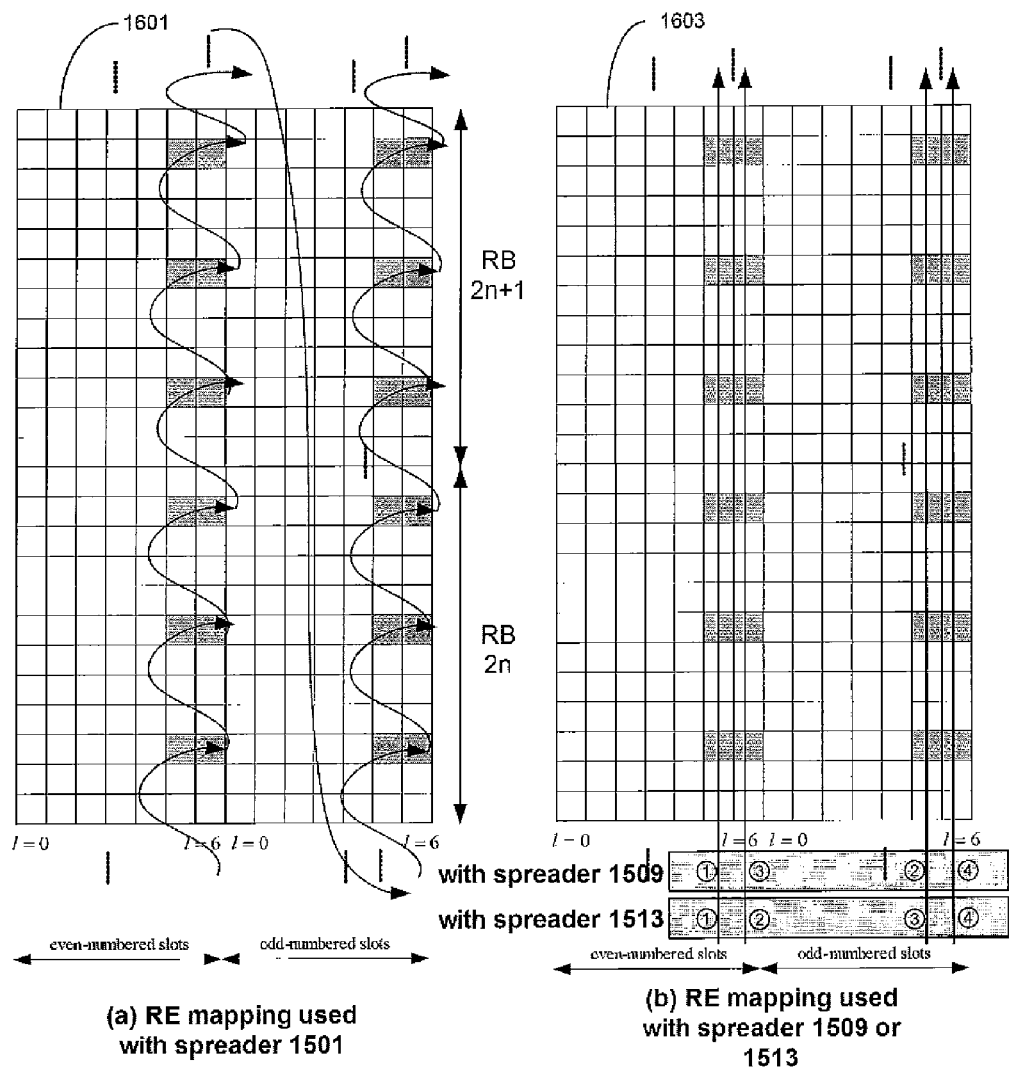
FIG. 16 illustrates two manners of resource element mapping according to embodiments of the present disclosure.

FIG. 16 illustrates two manners of resource element mapping according to embodiments of the present disclosure.

As indicated by the arrows in pilot pattern 1601, when the spreader 1501 is used, the first two reference signal symbols in reference sequence g are mapped onto two RS REs where a Walsh spreading is applied. The two RS REs have the smallest subcarrier index and the two smallest OFDM symbol indices. The second two reference signal symbols are then mapped onto the two RS REs having second lowest subcarrier index and the two smallest OFDM symbol indices. After all of the RS REs in the first two such OFDM symbols are mapped with reference signal symbols, the next two OFDM symbols in the reference signal sequence are mapped onto the two RS REs having the smallest subcarrier index and the next two smallest OFDM symbol indices, and so forth.

As indicated by the arrows in pilot pattern 1603, when the spreader 1509 is used, the first half of the symbols in reference sequence g is mapped onto the set of RS REs where the first symbol of the Walsh code is applied, and the second half of the symbols in reference sequence g is mapped onto the set of RS REs where the second symbol of the Walsh code is applied in a frequency-first manner. In this embodiment, the RS symbol mapping is carried out in the order of OFDM symbol 5 in slot 0, OFDM symbol 5 in slot 1, OFDM symbol 6 in slot 0, and OFDM symbol 6 in slot 1.

As indicated by the arrows in pilot pattern 1603, when the spreader 1513 is used, the first quarter of the symbols in reference sequence g is mapped onto the set of RS REs in the first slot where the first symbol of the Walsh code is applied, the second quarter of the symbols in reference sequence g is mapped onto the set of RS REs in the first slot where the second symbol of the Walsh code is applied, the third quarter of the symbols in reference sequence g is mapped onto the set of RS REs in the second slot where the first symbol of the Walsh code is applied, and the fourth quarter of the symbols in reference sequence g are mapped onto the set of RS REs in the second slot where the second symbol of the Walsh code is applied in order from the lowest subcarrier index to the highest subcarrier index. In this embodiment, the RS symbol mapping is carried out in the order of OFDM symbol 5 in slot 0, OFDM symbol 6 in slot 0, OFDM symbol 5 in slot 1, and OFDM symbol 6 in slot 1.

Figure 17:
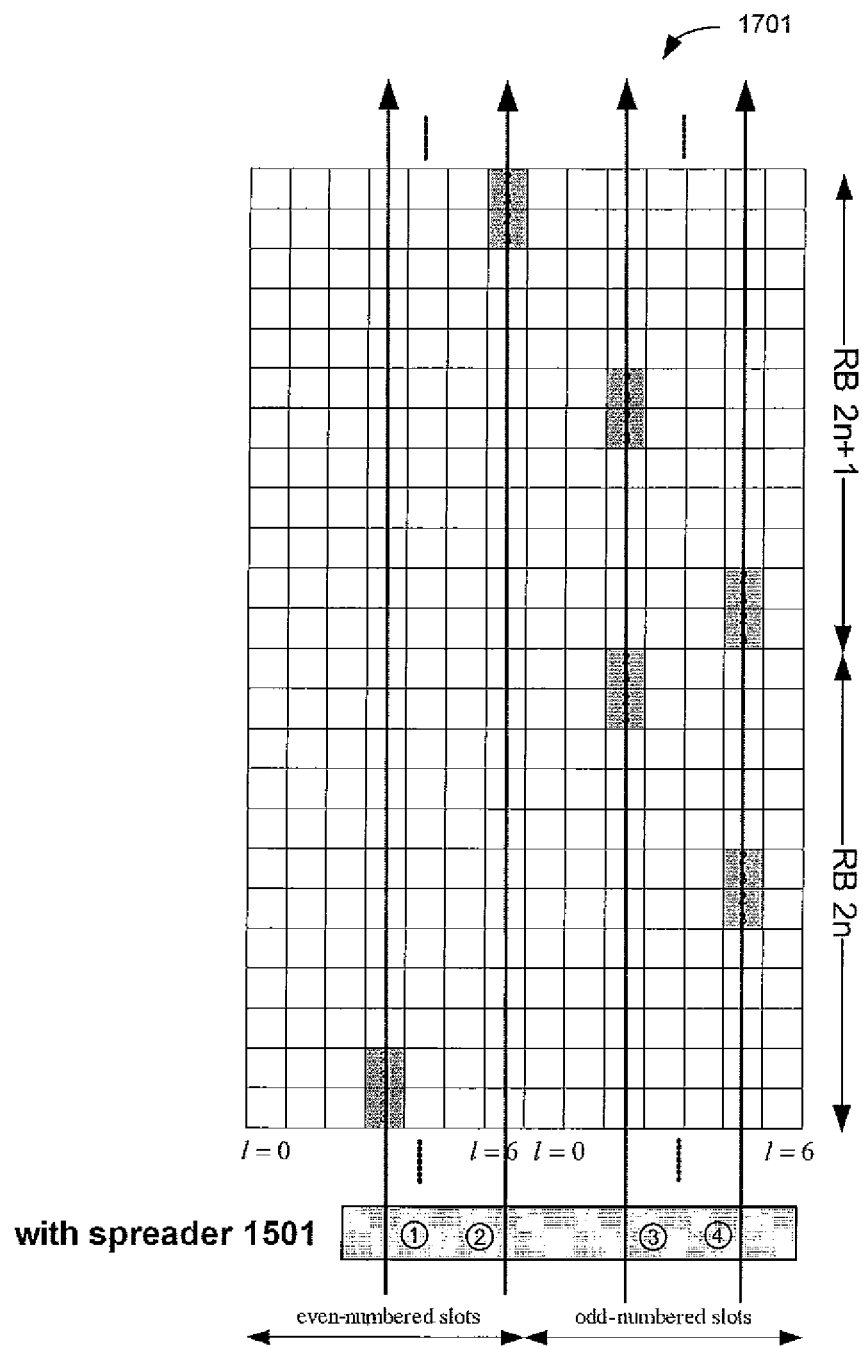
FIG. 17 illustrates a manner of resource element mapping according to another embodiment of the present disclosure.

FIG. 17 illustrates a manner of resource element mapping according to another embodiment of the present disclosure.

FIG. 17 illustrates a manner of resource element mapping of RS sequence symbols for UE-specific antenna port 3 (or for transmission layer 3) where an RS pattern 1701 supporting up to rank 8 and the spreader 1501 are utilized. In this embodiment, the RE mapping is done in a frequency-first, time-second manner.

In some embodiments, an eNodeB and a UE connected to the eNodeB share information regarding the ratio between the energy per RE (EPRE) in the data REs to the EPRE in the CSI RS REs. The ratio is denoted by $\rho_c = E_{data}/E_{CSI-RS}$, where $E_{data}$ and $E_{CSI-RS}$ are the EPRE in the data REs and the EPRE in the CSI RS REs, respectively.

In a particular embodiment, both the eNodeB and each UE derives $\rho_c$ from $\rho_A$, where information associated with $\rho_A$ is signaled in a layer higher than the PHY layer. The details on the definition of $\rho_A$ and the signaling are provided in section 5.2 of 3GPP 36.213, which is hereby incorporated by reference into the present application as if fully set forth herein.

In another embodiment, the eNodeB signals $P_c$ to each UE in a layer higher than the PHY layer, and each UE derives $\rho_c$ from $P_c$ using a relation known to both the eNodeB and each UE.

In a further embodiment, an eNodeB and a UE connected to the eNodeB share information regarding the ratio between the EPRE in the legacy CRS REs to the EPRE in the CSI RS REs. The ratio is denoted by $\rho_d = E_{CRS}/E_{CSI-RS}$, where $E_{CRS}$ and $E_{CSI-RS}$ are the EPRE in the legacy CRS REs and the EPRE in the CSI RS REs, respectively.

In some embodiments regarding information sharing, both the eNodeB and each UE know that there is a fixed $\rho_d$ without any signaling involved. The value of $\rho_d$ can be, for example, 0 dB, 3 dB, and so forth.

In other embodiments regarding information sharing, the eNodeB signals $P_d$ to each UE in a layer higher than the PHY layer, and each UE derives $\rho_d$ from $P_d$ using a relation known to both the eNodeB and each UE.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station comprising:
   a reference signal sequence generator configured to generate a reference signal sequence for each of n antenna ports using one initialization seed, n being a positive integer;
   n spreaders, each spreader corresponding to the respective one of the n antenna ports and configured to receive a respective reference signal sequence for the respective antenna port from the reference signal sequence generator and spread the respective reference signal sequence using a respective Walsh code; and
   n resource element mappers, each mapper corresponding to the respective one of the n antenna ports and configured to receive a respective spread reference signal sequence from a respective spreader and map the respective spread reference signal sequence to a set of reference signal resource elements corresponding to a respective antenna port,
   wherein the reference signal sequence generator comprises:
   a pseudo-random sequence generator configured to generate a pseudo-random sequence from the one initialization seed;
   a scrambling sequence generator configured to receive the pseudo-random sequence and generate a scrambling sequence from the pseudo-random sequence; and
   a sequence splitter configured to receive the scrambling sequence and generate n reference signal sequences for each of the n antenna ports from the scrambling sequence by diving the scrambling sequence into n subsequences.

2. A base station in accordance with claim 1 wherein the sequence splitter is configured to generate the n reference signal sequences for the n antenna ports by dividing the scrambling sequence into a first subsequence and a second subsequence, and
   wherein the first subsequence consists of even elements of the scrambling sequence and the second subsequence consists of odd elements of the scrambling sequence.

3. A base station in accordance with claim 1 wherein the sequence splitter is configured to generate the n reference signal sequences for n antenna ports by dividing the scrambling sequence into n subsequences, each of the n subsequences having a same number of consecutive elements of the scrambling sequence.

4. A base station in accordance with claim 1 wherein the reference signal sequence generator comprises:
   the pseudo-random sequence generator configured to generate the pseudo-random sequence from the one initialization seed;
   the scrambling sequence generator configured to receive the pseudo-random sequence and generate the scrambling sequence from the pseudo-random sequence; and
   a sequence duplicator configured to receive the scrambling sequence and generate the n reference signal sequences for the n antenna ports from the scrambling sequence by duplicating the scrambling sequence,
   wherein the n reference signal sequence for the n antenna ports are the same.

5. A subscriber station comprising:
   a receiver configured to receive a spread reference signal sequence from a base station, the spread reference signal sequence being mapped to a set of n reference signal resource elements corresponding to n respective antenna ports, and n being a positive integer,
   wherein the spread reference signal sequence is mapped by n resource element mappers at the base station, each of the n resource element mappers corresponds to the respective one of the n antenna ports and receives a respective spread reference signal sequence from a respective spreader of n spreaders at the base station,
   wherein the spread reference signal sequence is spread by n spreaders at the base station, each of the n spreaders corresponds to the respective one of the n antenna ports and receives a reference signal sequence for the respective antenna port from a reference signal sequence generator at the base station and generates the spread reference signal sequence by spreading the reference signal sequence using a respective Walsh code, and
   wherein the reference signal sequence generator comprises:
   a pseudo-random sequence generator configured to generate a pseudo-random sequence from the one initialization seed;

a scrambling sequence generator configured to receive the pseudo-random sequence and generate a scrambling sequence from the pseudo-random sequence; and a sequence splitter configured to receive the scrambling sequence and generate n reference signal sequences for each of the n antenna ports from the scrambling sequence by dividing the scrambling sequence into n subsequences.

6. A subscriber station in accordance with claim 5, wherein the sequence splitter is configured to generate the n reference signal sequences for the n antenna ports by dividing the scrambling sequence into a first subsequence and a second subsequence, and wherein the first subsequence consists of even elements of the scrambling sequence and the second subsequence consists of odd elements of the scrambling sequence.

7. A subscriber station in accordance with claim 5, wherein the sequence splitter is configured to generate the n reference signal sequences for n antenna ports by dividing the scrambling sequence into n subsequences, each of the n subsequences having a same number of consecutive elements of the scrambling sequence.

8. A subscriber station in accordance with claim 5 wherein the reference signal sequence generator comprises:

the pseudo-random sequence generator configured to generate the pseudo-random sequence from the one initialization seed;

the scrambling sequence generator configured to receive the pseudo-random sequence and generate the scrambling sequence from the pseudo-random sequence; and a sequence duplicator configured to receive the scrambling sequence and generate the n reference signal sequences for the n antenna ports from the scrambling sequence by duplicating the scrambling sequence, wherein the n reference signal sequence for the n antenna ports are the same.

\* \* \* \* \*